(12) United States Patent  
Guen (10) Patent No.: US 9,306,203 B2
(45) Date of Patent: Apr. 5, 2016

(54) RECHARGEABLE BATTERY AND BATTERY MODULE

(75) Inventor: Min-Hyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 84 days.

(21) Appl. No.: 13/448,229

(22) Filed: Apr. 16, 2012

(65) Prior Publication Data

US 2013/0078506 A1 Mar. 28, 2013

(30) Foreign Application Priority Data

Sep. 22, 2011 (KR) .................. 10-2011-0095931

(51) Int. Cl.
*H01M 2/20* (2006.01)
*H01M 2/30* (2006.01)
*H01M 10/04* (2006.01)

(52) U.S. Cl.
CPC ............. *H01M 2/202* (2013.01); *H01M 2/30* (2013.01); *H01M 10/0436* (2013.01)

(58) Field of Classification Search
None
See application file for complete search history.

(56) References Cited

U.S. PATENT DOCUMENTS

| 2010/0047686 A1* | 2/2010 | Tsuchiya et al. ............ 429/178 |
| 2010/0104941 A1 | 4/2010 | Nakabayashi |
| 2010/0323234 A1 | 12/2010 | Kim et al. |
| 2011/0076553 A1 | 3/2011 | Kameda et al. |

FOREIGN PATENT DOCUMENTS

| JP | 2008-97882 A | 4/2008 |
| JP | 2010-118304 | 5/2010 |
| JP | 2011-76731 | 4/2011 |
| KR | 10-2010-0137904 | 12/2010 |

OTHER PUBLICATIONS

KIPO Office action dated Feb. 1, 2016, for Korean priority Patent application 10-2011-0095931, (4 pages).
English machine translation of Japanese Publication 2010-118304 dated May 27, 2010, (13 pages).

* cited by examiner

*Primary Examiner* — Patrick Ryan
*Assistant Examiner* — Christopher Domone
(74) *Attorney, Agent, or Firm* — Lewis Roca Rothgerber Christie LLP (57) ABSTRACT

A rechargeable battery includes an electrode assembly having a positive electrode and a negative electrode; a case housing the electrode assembly; a cap plate coupled to the case; and a terminal electrically coupled to the electrode assembly and having a base portion located on the cap plate and a protrusion portion protruding from the base portion and spaced from the cap plate.

10 Claims, 8 Drawing Sheets

RECHARGEABLE BATTERY AND BATTERY MODULE

CROSS-REFERENCE TO RELATED APPLICATION

This application claims priority to and the benefit of Korean Patent Application No. 10-2011-0095931 filed in the Korean Intellectual Property Office on Sep. 22, 2011, the entire content of which is incorporated herein by reference.

BACKGROUND

1. Field

The described technology relates generally to a rechargeable battery and a battery module.

2. Description of Related Art

A rechargeable battery can be repeatedly charged and discharged, unlike a primary battery that cannot be recharged. A low-capacity rechargeable battery is used for a small portable electronic device such as a mobile phone, a laptop computer, and a camcorder. A large-capacity rechargeable battery is widely used as a power supply for driving a motor of a hybrid vehicle and the like.

Recently, a high-output rechargeable battery using a non-aqueous electrolyte solution with high energy density has been developed. The high-output rechargeable battery is configured of a large-capacity battery module by being coupled in parallel or series.

The battery module is generally configured of plurality of rechargeable batteries that are coupled with each other in series, and each of the rechargeable batteries may be formed in a cylindrical shape, a prismatic shape, and the like.

The rechargeable battery typically has externally protruding terminals, and the battery module is formed by electrically connecting the terminals. However, height difference between the terminals due to a process error may cause an electric connection failure between a bus bar connecting the terminals and the terminals.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery that can stably combine a terminal and a bus, and a battery module.

A rechargeable battery according to one aspect of the described technology includes: an electrode assembly comprising a positive electrode and a negative electrode; a case housing the electrode assembly; a cap plate coupled to the case; and a terminal electrically coupled to the electrode assembly and comprising a base portion located on the cap plate and a protrusion portion protruding from the base portion and spaced from the cap plate.

In one embodiment, a first end of the protrusion portion is fixed to the base portion and a second end of the protrusion portion is a free end. As such, the protrusion portion can be elastically deformable in a thickness direction of the protrusion portion. Further, a groove may be located at an intersection of the protrusion portion and the base portion. In one embodiment, the terminal is a plate and the protrusion portion is oriented to be substantially parallel to the cap plate.

A fastening member may be fixed to the protrusion portion. Additionally, in one embodiment, the terminal further includes a connection portion protruding from the base portion, wherein the connection portion is at least partially within the cap plate.

In one embodiment, an insulation member is located between the terminal and the cap plate, the insulation member including an insulation plate located adjacent the base portion and a lower insulation portion protruding from the base portion, being at least partially within the cap plate, and surrounding the connection portion. A current collecting member coupled to the electrode assembly may be attached to the terminal, and the insulation member can surround the current collecting member and the connection portion. Further, in one embodiment, the insulation member is located adjacent to the protrusion portion and wherein the protrusion portion is spaced from the insulation member.

In another embodiment, a battery module is provided including a plurality of batteries, each of the batteries including an electrode assembly, a cap plate, and an externally protruding terminal, wherein the terminal is electrically connected to the electrode assembly and includes a base portion located on the cap plate, a connection portion protruding from the base portion and at least partially within the cap plate, and a protrusion portion protruding from the base portion and spaced from the cap plate.

According to the exemplary embodiments, the protrusion portion is provided so that terminals can be stably connected with each other. Further, the insulation member is formed by insert-molding so that the terminal and the insulation member can be easily installed in the cap plate.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and the drawings.

Figure 1:
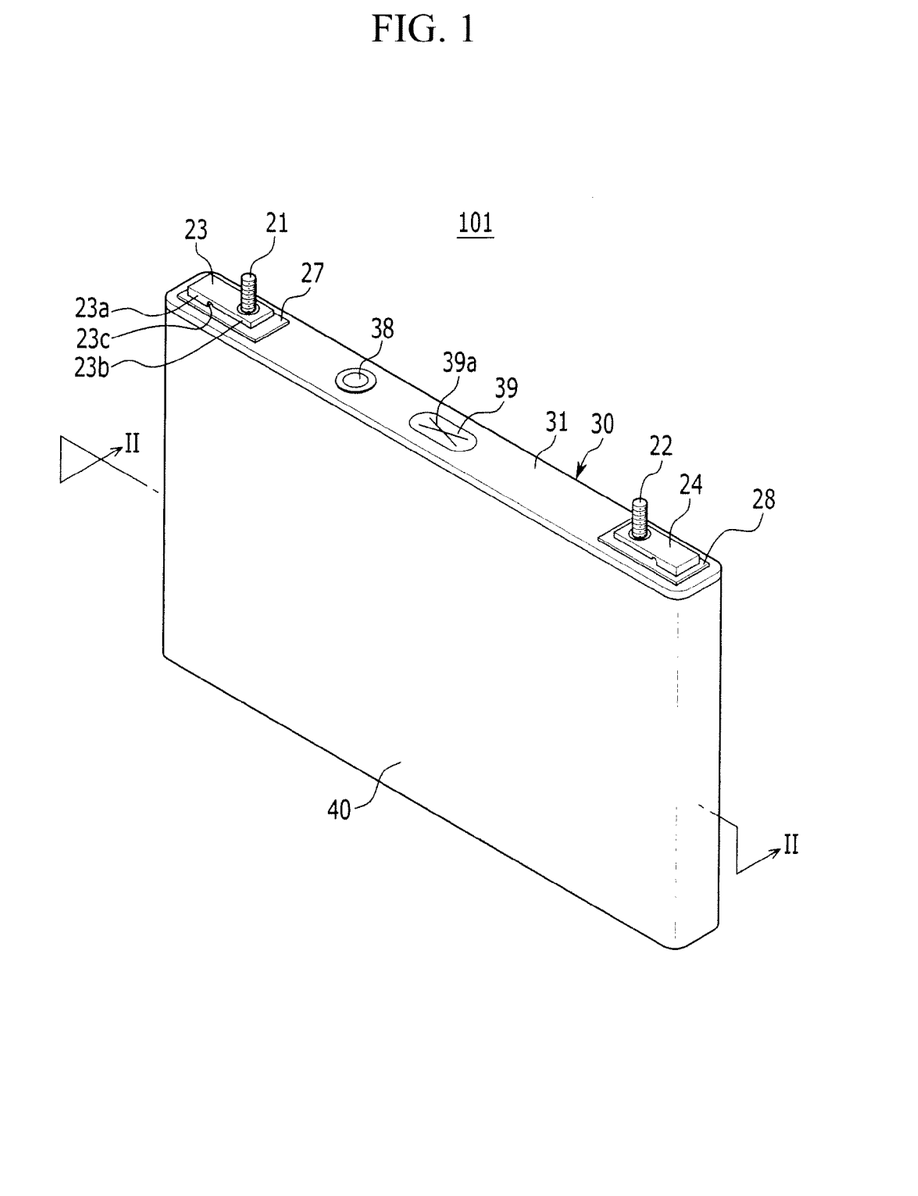
FIG. 1 is a perspective view of a rechargeable battery according to a first exemplary embodiment of the present invention.
Figure 2:
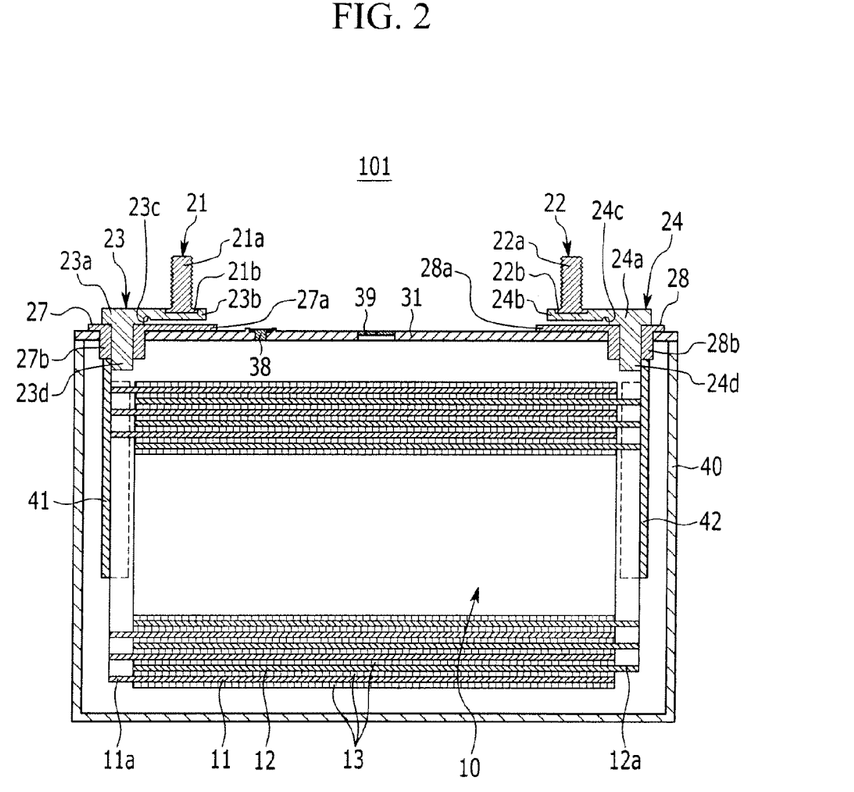
FIG. 2 is a cross-sectional view of FIG. 1, taken along the line II-II.

FIG. 1 is a perspective view of a rechargeable battery according to a first exemplary embodiment of the present invention and FIG. 2 is a cross-sectional view of FIG. 1, taken along the line II-II.

Referring to FIG. 1 and FIG. 2, a rechargeable battery 101 according to the first exemplary embodiment includes an electrode assembly 10 formed by spirally winding a positive electrode 11 and a negative electrode 12, with a separator 13 therebetween, a case 40 in which the electrode assembly 10 is installed, and a cap assembly 30 coupled to an opening of the case 40.

The rechargeable battery 101 according to the first exemplary embodiment is exemplarily described as a lithium ion secondary battery formed in the shape of a hexahedron. However, the present invention is not limited thereof, and the present invention may be applied to various shapes of batteries such as a lithium polymer battery or a cylindrical battery.

The positive electrode 11 and negative electrode 12 include coated regions where an active material is coated to a current collector formed of a thin metal foil and uncoated regions 11a and 12a where the active material is not coated. The positive electrode uncoated region 11a is formed at a first side end of the positive electrode 11 along a length direction of the positive electrode 11, and the negative uncoated region 12a is formed at a second side end of the negative electrode 12 along a length direction of the negative electrode 12. The positive electrode 11 and the negative electrode 12 are spirally wound with the separator 13 therebetween. In one embodiment, the separator 13 is an insulator.

However, the present invention is not limited thereto, and the electrode assembly 10 may have a structure where a positive electrode and a negative electrode, each formed of a plurality of sheets are alternately layered with a separator therebetween.

The case 40 is formed in approximately the shape of a cuboid, having an opening on one side thereof. The case 40 may be formed of metal such as aluminum or stainless steel.

The cap assembly 30 includes a cap plate 31 covering the opening of the case 40, a first electrode 23 protruding toward an outer side of the cap plate 31 and electrically connected with the positive electrode 11, and a second terminal 23 protruding toward an outer side of the cap plate 31 and electrically connected to the negative electrode 12.

The cap plate 31 is formed of a long plate extended in one direction, and is coupled to the opening of the case 40. The cap plate 31 is provided with a sealing cap 35 and a vent plate 39. The sealing cap 35 is installed in an electrolyte injection opening and the vent plate 39 has a notch 39a formed to be broken according to a predetermined internal pressure.

The first terminal 23 and the second terminal 24 protrude upwardly and outwardly from the cap plate 31. The first terminal 23 is electrically connected with the positive electrode 11 through a current collecting member 41 and the second terminal 24 is electrically connected with the negative electrode 12 through a current collecting member 42. However, the present invention is not limited thereto, and the first terminal 23 may be electrically connected with the negative electrode and the second terminal 24 may be electrically connected with the positive electrode.

Figure 3:
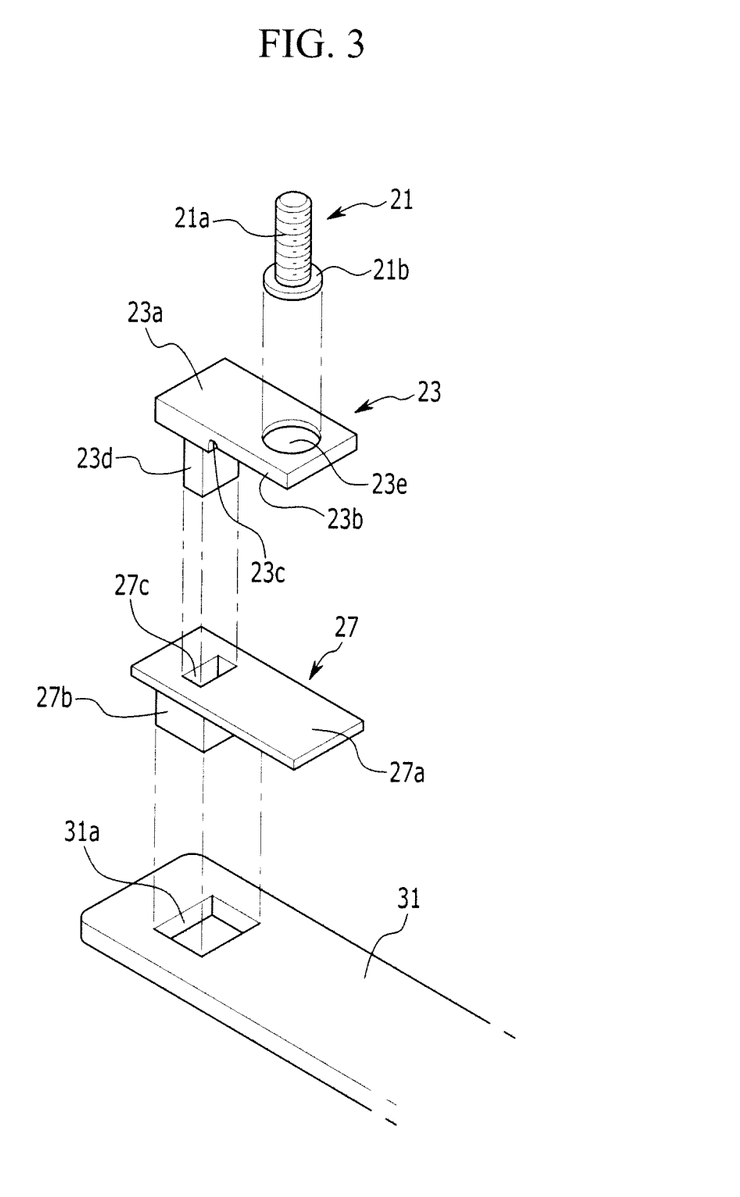
FIG. 3 is an exploded perspective view of a portion of the rechargeable battery according to the first exemplary embodiment of the present invention.

Referring to FIG. 2 and FIG. 3, the first terminal 23 includes a base portion 23a on the cap plate 31, a connection portion 23d protruding from the base portion 23a and then inserted to the cap plate 31, and a protrusion portion 23b protruding from the base portion 23a and spaced from a structure located therebelow.

The base portion 23a is formed in the shape of a plate and contacts an insulation member 27 provided therebelow. The connection portion 23d protrudes toward the case 40 from the bottom side of the base portion 23a and is inserted into the cap plate 31. A current collecting member 41 attached to the connection portion 23d is fixed to the positive electrode uncoated region 11a by welding. The protrusion portion 23b protrudes from a side of the base portion 23a in parallel with the cap plate 31 and the bottom side thereof is spaced from the insulation member 27. An end of a first side of the protrusion portion 23b is supported by the base portion 23a, and an end of a second side is suspended, thereby forming a space therebelow. Thus, the end of the first side of the protrusion portion 23b becomes a fixed end and the end of the second side becomes a free end.

In one embodiment, a groove 23c having an arc-shaped cross-section is formed in a corner of the bottom side where the base portion 23a and the protrusion portion 23b contact each other, i.e., at an intersection of the base portion and the protrusion portion. Thus, the thickness of the protrusion portion 23b at the groove 23c is less than the thickness at the periphery region, and accordingly the protrusion portion 23b is elastic deformable.

The protrusion portion 23b is oriented parallel to the cap plate 31, and thus the upper side of the protrusion portion 23b is movable in a height direction (when case stands up such that terminal faces upward) of the rechargeable battery.

A groove 23e into which a fastening member 21 is inserted is formed in the upper side of the protrusion portion 23b such that the groove 23e has a circular-shaped transverse cross-section. The fastening member 21 includes a pole portion 21a and a flange portion 21b formed in a lower portion of the pole portion 21a. A thread is formed on an external circumference of the pole 21a and is configured to be fastened with a nut.

The insulation member 27 includes an insulation plate 27a located under the base portion 23a and a lower insulation portion 27b protruding from the insulation plate 27a and inserted into the cap plate 31.

The insulation plate 27a is located under the base portion 23a and the protrusion portion 23b and contacts the base portion 23a. However, the protrusion portion 23b is spaced from the insulation plate 27a and thus a gap is formed between the protrusion portion 23b and the insulation plate 27a. An opening 27c to which a connection portion is inserted is formed in the insulation plate 27a, and the opening 27c is extended to the lower insulation portion 27b from the insulation plate 27a.

The lower insulation portion 27b is inserted into a terminal opening 31a formed in the cap plate 31. The lower insulation portion 27b is formed to surround a circumference of the connection portion 23d to electrically insulate the cap plate 31 from the connection portion 23d. The first terminal 23 is installed in the cap plate 31 and then the insulation member 27 is formed through insert molding. Accordingly, when the insulation member 27 is formed, the first terminal 23 and the insulation member 27 may be fixed to the cap plate 31.

As described, according to the present exemplary embodiment, the insulation member 27 is formed through the insert molding and therefore the first terminal 23 and the insulation member 27 can be easily installed and the first terminal and the insulation member 27 can be stably fixed.

Referring to FIG. 2, the second terminal 24 includes a base portion 24a on the cap plate 31, a connection portion 24d protruding from the base portion 24a and inserted into the cap plate 31, and a protrusion portion 24b protruding from the base portion 24a and spaced from a structure on a lower portion thereof.

The base portion 24a is formed in the shape of a plate, and contacts an insulation member 28 formed in a lower portion thereof. The connection portion 24d is formed protruding toward the case 40 from the bottom side of the base portion 24a and inserted to the cap plate 31. A current collecting member 42 attached to the negative electrode uncoated region 12a is fixed to the connection portion 24d by welding. The protrusion portion 24b protrudes toward an inner side of the cap plate 31 in a length direction from a side of the base portion 24a, and a bottom side thereof is spaced from the insulation member 28, in other words, the structure located in the lower portion thereof. An end of a first side of the protrusion portion 24b is supported by the base portion 24a and an end of a second side is suspended to provide a gap therebelow. Accordingly, the end of the first side of the protrusion portion 24b is a fixed end and the end of the second side is a free end.

In one embodiment, a groove 24c having an arc-shaped cross-section is formed in a corner of the bottom side where the base portion 24a and protrusion portion 24b contact each other. Accordingly, the thickness of the protrusion portion 24b in a portion where the groove 24c is less than a thickness of the periphery region and thus the protrusion portion 24b can be elastically deformable.

The protrusion portion 24b is oriented to be substantially parallel to the cap plate 31, and thus the upper surface of the protrusion portion 24b is movable in a height direction (when case stands up such that terminal faces upward) of the rechargeable battery.

A fastening member 22 is fixed to the upper surface of the protrusion portion 24b by welding. The fastening member 22 includes a pole portion 22a and a flange portion 22b formed on a lower portion of the pole portion 22a. A thread is formed in an external circumference of the pole 22a and configured to be fastened with a nut.

The insulation member 28 includes an insulation plate 28a located under the base portion 24a and a lower insulation portion 28b protruding from the insulation plate 28a and inserted into the cap plate 31.

The insulation plate 28a is located under the base portion 24a and the protrusion portion 24b and contacts the base portion 24a. However, the protrusion portion 24b is spaced from the insulation plate 28a and thus a gap is formed between the protrusion portion 24b and the insulation plate 28a.

The lower insulation portion 28b penetrates the cap plate 31, and surrounds a periphery of the connection portion 24d for electric insulation between the cap plate 31 and the connection portion 24d. While the second terminal 24 is installed in the cap plate 31, the insulation member 28 is formed by insert-molding. Accordingly, when the insulation member 28 is formed, the second terminal 24 and the insulation member 28 may be fixed to the cap plate 31.

Figure 4:
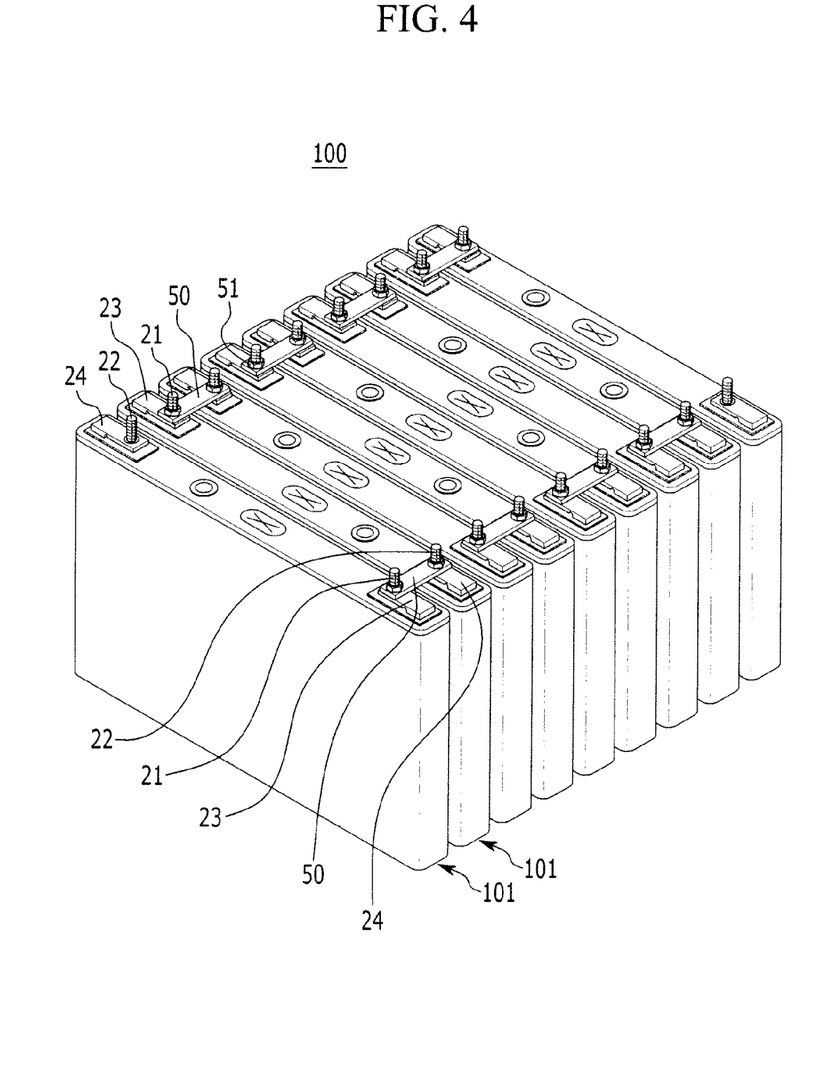
FIG. 4 is a perspective view of a battery module according to the first exemplary embodiment of the present invention.

FIG. 4 is a perspective view of a battery module according to the first exemplary embodiment of the present invention.

Referring to FIG. 2 and FIG. 4, a battery module 100 according to the present exemplary embodiment includes a plurality of rechargeable batteries 101 having a first terminal 23 and a second terminal 24 and connection members 50 electrically connecting the plurality of rechargeable batteries 101.

The rechargeable batteries 101 arranged in parallel with each other are coupled in series by the connection members 50, and the first terminals 23 and the second terminals 24 of neighboring rechargeable batteries 101 are alternately arranged with each other and thus a first terminal 23 of one rechargeable battery 101 is electrically connected with a second terminal 24 is its neighboring rechargeable battery 101 by a connection member 50.

The connection member 50 is formed in the shape of a plate, and an opening to which the fastening members 21 and 22 are formed in each connection member 50.

The connection member 50 is fixed to the fastening members 21 and 22 while the fastening members 21 and 22 are inserted in the openings. The bottom surface of the connection member 50 contacts the upper surfaces of the first and second terminals 23 and 24. In this case, the connection member 50 contacts the protrusion portion 23b of the first terminal 23 and the protrusion portion 24b of the second terminal 24.

When the first terminal 23 and the second terminal 24 are at different heights, a contact failure may occur between the connection member 50 and the first terminal 23 or the second terminal 24, thereby causing increase of resistance or a failure in electrical connection.

However, as in the present exemplary embodiment, the protrusion portion 23b is deformable in a vertical direction with respect to the base portion 23a so that the connection member 50 can stably connect the first terminal 23 and the second terminal 24.

Figure 5:
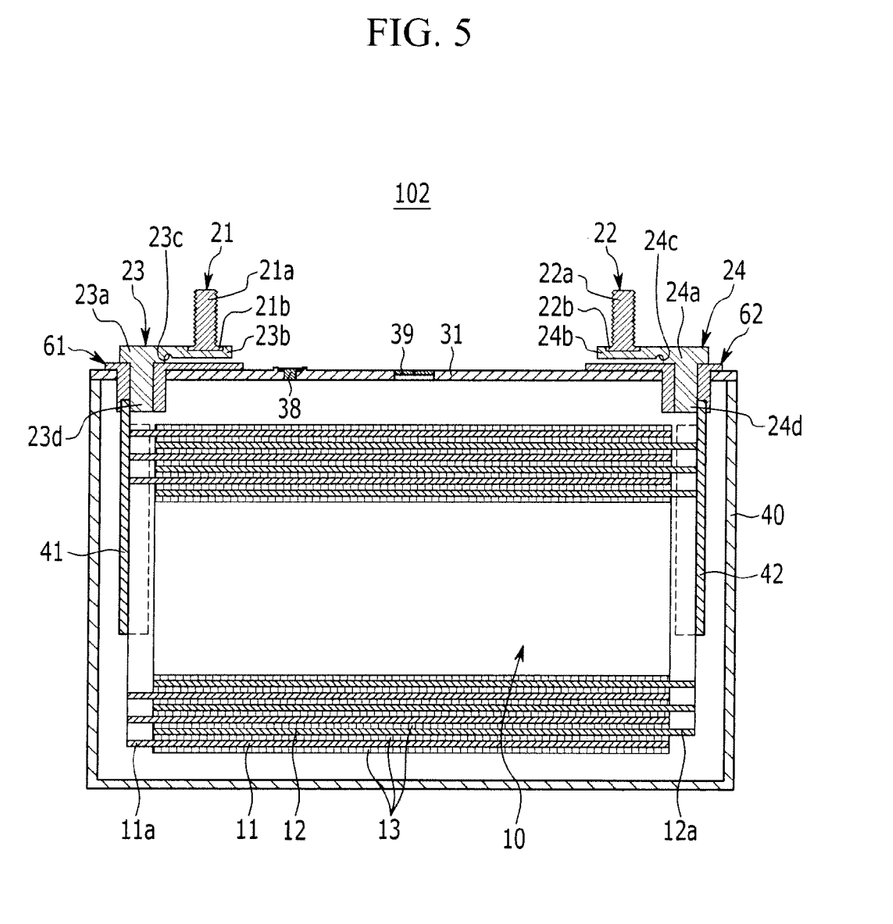
FIG. 5 is a cross-sectional view of a rechargeable battery according to a second exemplary embodiment of the present invention.
Figure 6:
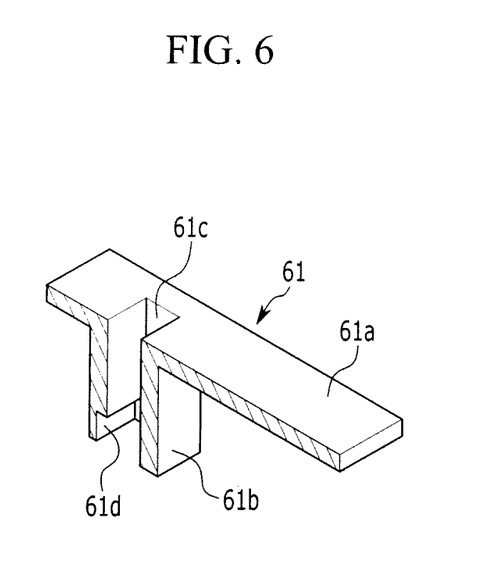
FIG. 6 is a cut-away perspective view of an insulation member of the rechargeable battery according to the second exemplary embodiment of the present invention.

FIG. 5 is a cross-sectional view of a rechargeable battery according to a second exemplary embodiment of the present invention, and FIG. 6 is a cut-away cross-sectional view of the rechargeable battery according to the second exemplary embodiment of the present invention.

Referring to FIG. 5 and FIG. 6, a rechargeable battery 102 according to the present exemplary embodiment is the same as the rechargeable battery of the first exemplary embodiment, excluding structures of insulation members 61 and 62, and therefore a repeated description for the same structure will be omitted.

The insulation member 61 is located between a first terminal 23 and a cap plate 31, and the insulation member 62 is located between a second terminal 24 and the cap plate 31. The insulation member 62 provided in the second terminal 24 and the insulation member 61 provided in the first terminal 23 have substantially the same structure, and therefore the insulation member 61 provided in the first terminal 23 will be described and a description for the insulation member 62 provided in the second terminal 24 will be omitted.

The insulation member 61 includes an insulation plate 61a located under a base portion 23a and a lower insulation portion 61b protruding from the insulation plate 61a and inserted to the cap plate 31.

The insulation plate 61a is located in a lower portion of the base portion 23a and the protrusion portion 23b and contacts the base portion 23a. However, the protrusion portion 23b is spaced from the insulation plate 61a such that a gap is formed between the protrusion portion 23b and the insulation plate 61a.

An opening 61c to which a connection portion is inserted is formed in the insulation plate 61a, and the opening 61c is extended from the insulation plate 61a to the lower insulation portion 61b. A groove 61d to which a current collecting member 41 is inserted is formed in a lower portion of the opening 61c. An upper end of the current collecting member 41 is inserted in the opening 61c, and a portion where the current collecting member 41 and the connection portion 23d are bonded to each other is inserted to the lower insulation member 61.

The lower insulation portion 61b is inserted to a opening formed in the cap plate 31. In addition, the lower insulation portion 61b surrounds a circumference of the connection portion 23d to electrically insulate the cap plate 31 and the connection portion 23d from each other. The insulation member 61 is formed by insert-molding in the state that the current collecting member is bonded to the first terminal by welding and the first terminal 23 is installed in the cap plate 31. Thus, when the insulation member 61 is formed, the insulation member 61 is formed to surround the connection portion 23d and the current collecting member 41. In addition, when the insulation member 61 is formed, the first terminal 23 and the insulation member 61 are fixed to the cap plate 31.

As described, according to the present exemplary embodiment, the insulation member 61 surrounds the first terminal 23 and the current collecting member 41, and therefore the first terminal 23 and the current collecting member 41 can maintain a stable contact state. In addition, since the insulation member 61 is formed by insert-molding, the first terminal 23 and the insulation member 61 can be easily installed and the first terminal 23 and the insulation member 61 can be stably combined to each other in a fixed manner.

Figure 7:
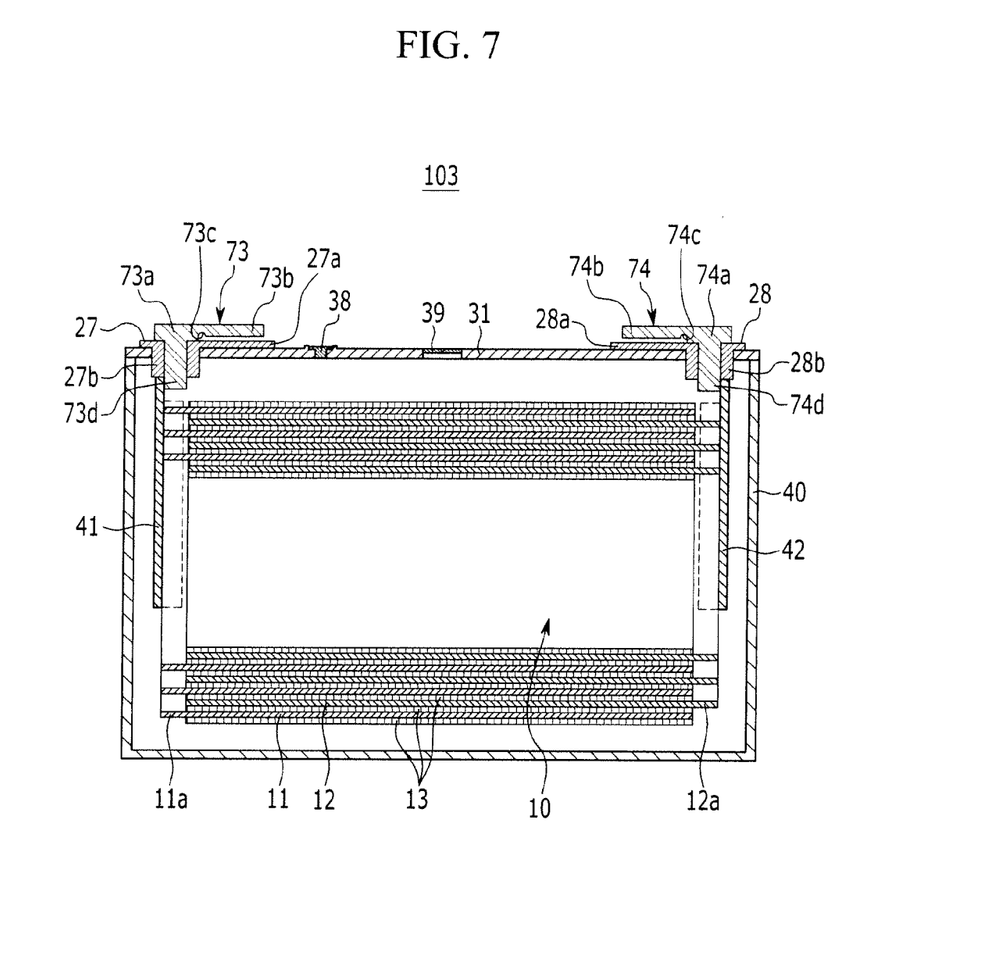
FIG. 7 is a cross-sectional view of a rechargeable battery according to a third exemplary embodiment of the present invention.
Figure 8:
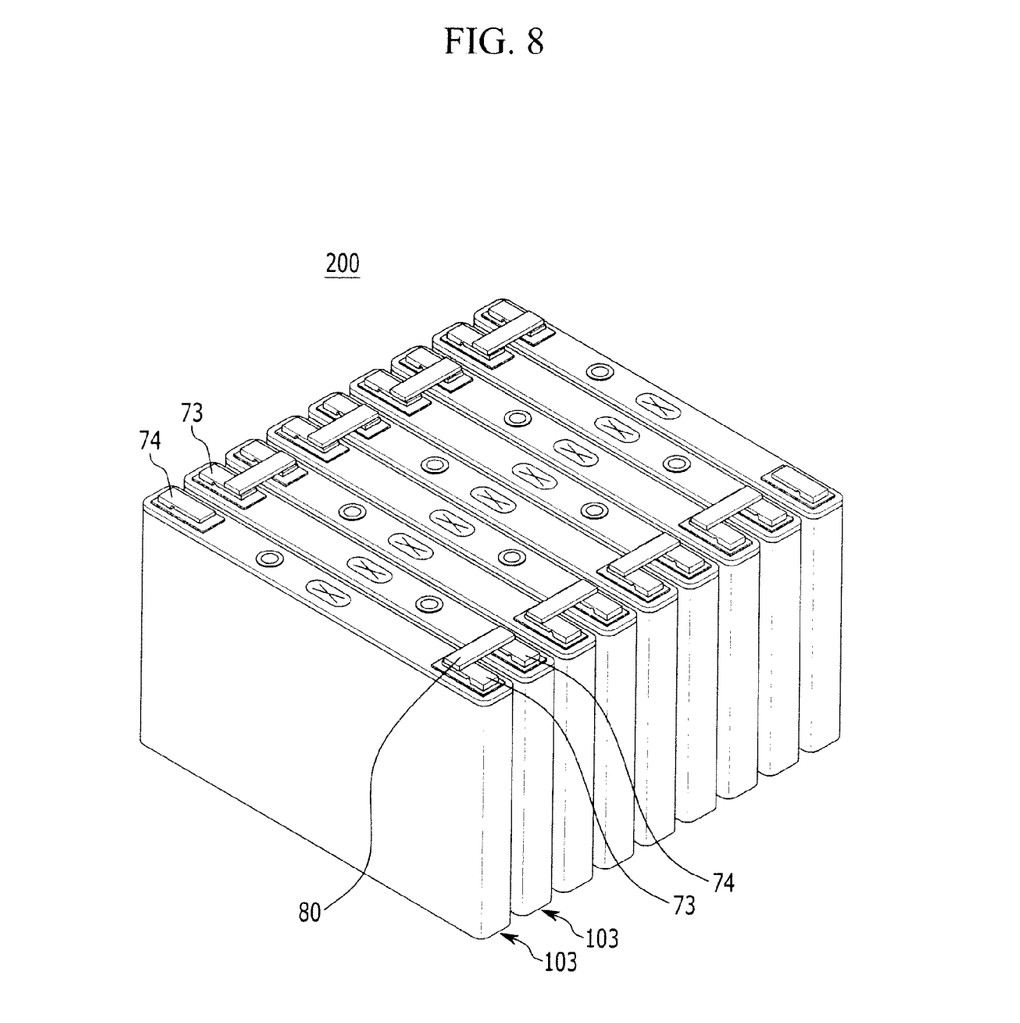
FIG. 8 is a perspective view of a battery module according to the third exemplary embodiment of the present invention.

FIG. 7 is a cross-sectional view of a rechargeable battery according to a third exemplary embodiment of the present invention and FIG. 8 is a perspective view of a battery module according to the third exemplary embodiment of the present invention.

Referring to FIG. 7 and FIG. 8, a rechargeable battery 103 according to the third exemplary embodiment includes an electrode assembly 10 formed by spirally winding a positive electrode 11 and a negative electrode 12, with a separator 13 therebetween, a case 40 in which the electrode assembly 10 is installed, a cap plate 31 coupled to an opening of the case, and first and second terminals 73 and 74 provided in the cap plate 31.

The rechargeable battery 103 of the third exemplary embodiment is the same as the rechargeable battery of the first exemplary embodiment in structure, excluding structures of the first and second terminals 73 and 74, and therefore the same structure will not be further described.

The first terminal 73 includes a base portion 73a located on the cap plate 31, a connection portion 73d protruding from the base portion 73a and inserted to the cap plate 31, and a protrusion portion 73b protruded from the base portion 73a and separated from a structure located in a lower portion thereof.

The base portion 73a is formed in the shape of a plate, and contacts an insulation member 27 provided in the lower portion thereof. The connection portion 73d protrudes toward the case 40 from the bottom surface of the base portion 73a and is inserted to the cap plate 31. A current collecting member 41 attached to a positive electrode uncoated region 11a is fixed to the connection portion 73d by welding. The protrusion portion 73b protrudes toward the inside of the cap plate 31 from a side surface of the base portion 73a, and the bottom surface of the protrusion portion 73b is distanced from the insulation member 27, that is, the structure located in the lower portion of the base portion 73a. A first side end of the protrusion portion 73b is supported by the base portion 73a and a second side end is suspended, thereby forming a gap therebelow. Thus, the first side end of the protrusion portion 73b is a fixed end and the second side end is a free end.

Meanwhile, a groove 73c having an arc-shaped cross-section is formed in a corner of the bottom side where the base portion 73a and the protrusion portion 73b contact each other. Thus, the thickness of the protrusion portion 73b in a portion where the groove 73c is formed is less than a thickness of the periphery region, and accordingly the protrusion portion 73b becomes elastic deformable.

The protrusion portion 73b is located in parallel with the cap plate 31, and thus the upper side of the protrusion portion 73b is movable in a height direction (when the case stands up such that terminal faces upward) of the rechargeable battery.

A groove 73e in which a fastening member 21 is inserted is formed in the upper side of the protrusion portion 73b such that the groove 73e has a circular-shaped transverse cross-section. The fastening member 21 includes a pole portion 21a and a flange portion 21b formed in a lower portion of the pole portion 21a. A thread is formed in an external circumference of the pole portion 21a and configured to be fastened with a nut.

The second terminal 74 includes a base portion 74a located on the cap plate 31, a connection portion 74d protruded from the base portion 74a and inserted to the cap plate 31, and a protrusion portion 74b protruding from the base portion 74a and spaced from a structure located in a lower portion thereof.

Since the second terminal 74 is formed in the same structure of the first terminal 73, the second terminal 74 will not be further described.

A battery module 200 according to the present exemplary embodiment includes a plurality of rechargeable batteries 103 having first and second terminals 73 and 74 and connection members 80 electrically connecting the rechargeable batteries 103.

The rechargeable batteries 103 arranged in parallel with each other are coupled in series by the connection members 80, and the first terminals 73 and the second terminals 74 of neighboring rechargeable batteries 103 are alternately arranged with each other and thus a first terminal 73 of one rechargeable battery 103 is electrically connected with a second terminal 74 of its neighboring rechargeable battery 103 by a connection member 80.

The connection member 80 is formed in the shape of a plate and bonded to the first and second terminals 73 and 74 by welding. In this case, the connection member 80 contacts the protrusion portion 73b of the first terminal 73 and the protrusion portion 74b of the second terminal 74.

When the first terminal 73 and the second terminal 74 have different heights, a contact failure occur between the connection member 80 and the first terminal 73 or the second terminal 74 so that resistance may be increased or electric connection may be failed.

However, as in the present exemplary embodiment, the protrusion portions 73b and 74b are vertically deformable with respect to the base portions 73a and 74a so that the terminals of each battery can be substantially level with each other, and therefore the connection member 80 can stably connect the first terminal 73 and the second terminal 74.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 100, 200: battery module | 101, 102, 103: rechargeable battery |
| 10: electrode assembly | 11: positive electrode |
| 11a: positive electrode uncoated region | 12: negative electrode |
| 12a: negative electrode uncoated region | 13: separator |
| 21, 22: fastening member | 21a, 22a: pole portion |
| 21b, 22b: flange portion | 23, 73: first terminal |
| 23a, 24b, 73a, 74a: base portion | |
| 23b, 24b, 73b, 74b: protrusion portion | |
| 23d, 24d, 73d, 74d: connection portion | |
| 23c, 23e, 24c, 61d, 73c, 73e: groove | |
| 24, 74: second terminal | 27, 28, 61, 62: insulation member |
| 27a 28a, 61a: insulation plate | |
| 27b, 28b, 61b: lower insulation portion | |
| 27c, 61c: opening | |

What is claimed is:

1. A rechargeable battery comprising:
an electrode assembly comprising a positive electrode and a negative electrode;
a current collecting member coupled to the electrode assembly;
a case housing the electrode assembly;
a cap plate coupled to the case; and
a terminal electrically coupled to the electrode assembly and comprising a base portion located on the cap plate and a protrusion portion integral with and protruding from the base portion and spaced from the cap plate, wherein the base portion comprises an integral connection portion that directly contacts the current collecting member, wherein the protrusion portion is elastically deformable in a thickness direction of the protrusion portion, and wherein a groove is located at an intersection of the protrusion portion and the base portion in a corner of a bottom side of the terminal.

2. The rechargeable battery of claim 1, wherein a first end of the protrusion portion is fixed to the base portion and wherein a second end of the protrusion portion is a free end.

3. The rechargeable battery of claim 1, wherein the protrusion portion protrudes from a side of the base portion.

4. The rechargeable battery of claim 1, wherein the terminal is a plate and wherein the protrusion portion is oriented to be substantially parallel to the cap plate.

5. The rechargeable battery of claim 1, wherein a fastening member is fixed to the protrusion portion.

6. The rechargeable battery of claim 1, wherein the connection portion is at least partially within the cap plate.

7. The rechargeable battery of claim 1, wherein an insulation member is located between the terminal and the cap plate, the insulation member comprising an insulation plate located adjacent the base portion and a lower insulation portion protruding from the base portion, being at least partially within the cap plate, and surrounding the connection portion.

8. The rechargeable battery of claim 7, wherein the insulation member is insert-molded.

9. The rechargeable battery of claim 7, wherein the insulation member surrounds the current collecting member and the connection portion.

10. The rechargeable battery of claim 7, wherein the insulation member is located adjacent to the protrusion portion and wherein the protrusion portion is spaced from the insulation member.

* * * * *